US010026414B2

(12) United States Patent
Tsujikawa et al.

(10) Patent No.: US 10,026,414 B2
(45) Date of Patent: Jul. 17, 2018

(54) SPEECH PROCESSING SYSTEM, VEHICLE, SPEECH PROCESSING UNIT, STEERING WHEEL UNIT, SPEECH PROCESSING METHOD, AND SPEECH PROCESSING PROGRAM

(71) Applicant: NEC Corporation, Tokyo (JP)

(72) Inventors: Masanori Tsujikawa, Tokyo (JP); Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/917,859

(22) PCT Filed: May 14, 2014

(86) PCT No.: PCT/JP2014/062851
§ 371 (c)(1),
(2) Date: Mar. 9, 2016

(87) PCT Pub. No.: WO2015/040886
PCT Pub. Date: Mar. 26, 2015

(65) Prior Publication Data
US 2016/0225386 A1    Aug. 4, 2016

(30) Foreign Application Priority Data

Sep. 17, 2013  (JP) .................................. 2013-192096

(51) Int. Cl.
*G10L 21/0216* (2013.01)
*G10L 21/0208* (2013.01)
(Continued)

(52) U.S. Cl.
CPC ...... *G10L 21/0216* (2013.01); *B60R 11/0247* (2013.01); *H04M 1/6091* (2013.01);
(Continued)

(58) Field of Classification Search
CPC ............ G10L 15/28; G10L 2021/02165; G10L 21/0208
See application file for complete search history.

(56) References Cited

U.S. PATENT DOCUMENTS 2,644,858 A * 7/1953 Small ..................... H04R 1/08
                                                     381/361
4,126,827 A * 11/1978 Negrini ................... H04R 1/08
                                                     200/61.54
(Continued)

FOREIGN PATENT DOCUMENTS

JP   2000-324233 A   11/2000
JP   2008-020872 A    1/2008
(Continued)

OTHER PUBLICATIONS

Frodl, R., "New Generation of Active Microphones for Handsfree Communication and Voice Recognition," SAE Technical Paper 1999-01-0487, 1999. (Year: 1999).*
(Continued)

*Primary Examiner* — Brian L Albertalli
(74) *Attorney, Agent, or Firm* — Wilmer Cutler Pickering Hale and Dorr LLP

(57) ABSTRACT

A speech processing system placed in a vehicle to effectively acquire a voice of a driver includes a first microphone that is provided on a surface facing the driver of the vehicle out of a steering wheel of the vehicle, and inputs a voice of the driver, a second microphone that is provided at a position where the voice of the driver of the vehicle is blocked by at least part of the steering wheel in the vehicle, and inputs noise in the vehicle, and a noise suppressor that suppresses an estimated noise signal based on a first signal corresponding to the sound input to the first microphone and a second signal corresponding to the sound input to the second
(Continued)

microphone, and generates and outputs a pseudo speech signal.

3 Claims, 13 Drawing Sheets

(51) Int. Cl.
    *H04R 1/32*     (2006.01)
    *B60R 11/02*    (2006.01)
    *H04M 1/60*    (2006.01)
    *H04R 1/40*    (2006.01)

(52) U.S. Cl.
    CPC .......... *H04R 1/326* (2013.01); *G10L 21/0208* (2013.01); *G10L 2021/02165* (2013.01); *H04R 1/406* (2013.01); *H04R 2410/01* (2013.01); *H04R 2410/05* (2013.01); *H04R 2499/13* (2013.01)

(56) References Cited

U.S. PATENT DOCUMENTS

| | | | | |
|---|---|---|---|---|
| 4,614,839 A * | 9/1986 | Umebayashi | ....... | H04M 1/2745 379/88.16 |
| 4,629,828 A * | 12/1986 | Umebayashi | ......... | H04M 1/737 379/56.1 |
| 4,647,722 A * | 3/1987 | Nishida | ............... | H04M 1/6075 455/566 |
| 4,729,254 A | 3/1988 | Nogami et al. | | |
| 4,850,015 A * | 7/1989 | Martin | ................ | B60R 11/0241 224/276 |
| 2002/0031234 A1 * | 3/2002 | Wenger | .................. | H04R 1/406 381/86 |
| 2004/0076305 A1 * | 4/2004 | Santiago | ................ | H04R 1/406 381/356 |
| 2004/0138882 A1 * | 7/2004 | Miyazawa | ............ | G10L 15/065 704/233 |
| 2004/0240679 A1 * | 12/2004 | Kennedy | ................ | H04R 27/00 381/82 |
| 2005/0280250 A1 * | 12/2005 | Hirzmann | ........... | B60R 11/0247 280/731 |
| 2007/0218959 A1 * | 9/2007 | Kim | ...................... | H04M 9/082 455/569.2 |
| 2009/0192795 A1 * | 7/2009 | Cech | ....................... | B60R 11/02 704/233 |
| 2011/0101654 A1 | 5/2011 | Cech | | |
| 2013/0311175 A1 | 11/2013 | Arakawa et al. | | |
| 2013/0322658 A1 * | 12/2013 | Lee | ........................ | H04R 1/342 381/122 |
| 2014/0112496 A1 * | 4/2014 | Murgia | ............... | G10L 21/0216 381/92 |

FOREIGN PATENT DOCUMENTS

| | | |
|---|---|---|
| JP | 2013-509329 A | 3/2013 |
| WO | WO-86/005452 A1 | 9/1986 |
| WO | WO-2011/059727 A1 | 5/2011 |
| WO | WO-2012/096072 A1 | 7/2012 |

OTHER PUBLICATIONS

International Search Report, Corresponding to PCT/JP2014/062851, dated Jun. 24, 2014, 2 pp.

\* cited by examiner

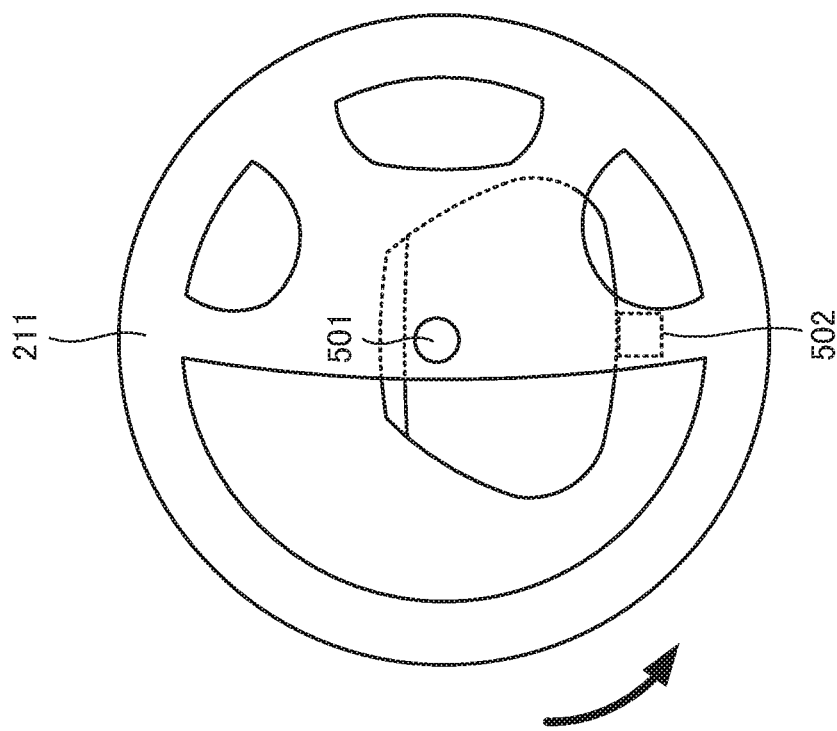
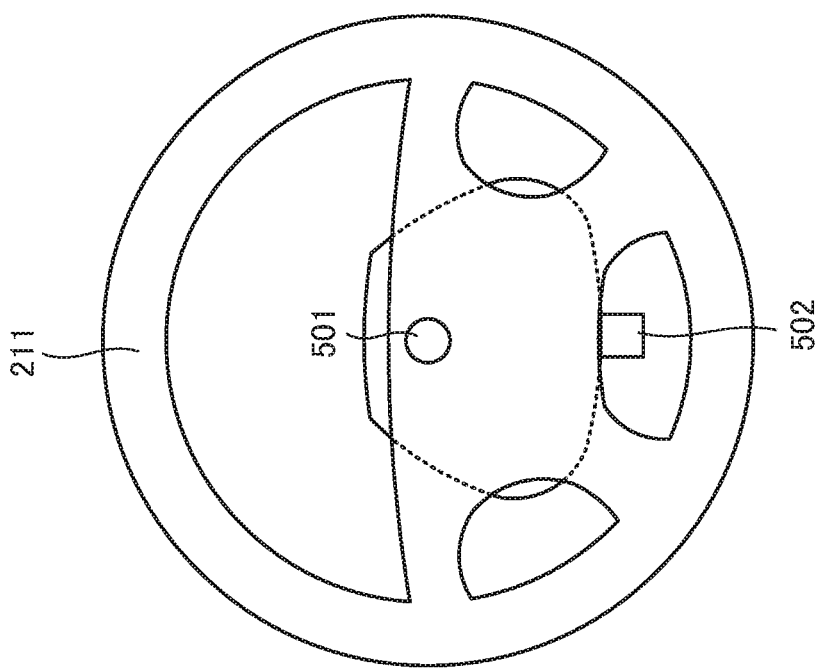
FIG. 6

| DRIVER SEAT POSITION | NOISE SOURCE | FIRST MICROPHONE ||||| SECOND MICROPHONE |||||
|---|---|---|---|---|---|---|---|---|---|---|---|
| | | 801 | 802 | 803 | 804 | ... | 805 | 806 | 807 | 808 | ... |
| | | ○ | × | × | × | ... | × | × | × | × | ... |
| | | × | ○ | × | × | ... | × | × | × | × | ... |
| | | × | × | ○ | × | ... | × | × | × | × | ... |
| | | × | × | × | ○ | ... | × | × | × | × | ... |
| | | × | × | × | × | ... | ○ | × | × | × | ... |
| | | × | × | × | × | ... | × | ○ | × | × | ... |
| | | × | × | × | × | ... | × | × | ○ | × | ... |
| | | × | × | × | × | ... | × | × | × | ○ | ... |
| ... | ... | ... | ... | ... | ... | | ... | ... | ... | ... | |

SPEECH PROCESSING SYSTEM, VEHICLE, SPEECH PROCESSING UNIT, STEERING WHEEL UNIT, SPEECH PROCESSING METHOD, AND SPEECH PROCESSING PROGRAM

CROSS-REFERENCE TO RELATED APPLICATIONS

The present application is a national stage application of International Application No. PCT/JP2014/062851 entitled "Speech Processing System, Vehicle, Speech Processing Unit, Steering Wheel Unit, Speech Processing Method, and Speech Processing Program," filed on May 14, 2014, which claims the benefit of priority from Japanese Patent Application No. JP2013-192096, filed on Sep. 17, 2013, the disclosures of which are incorporated herein in their entirety by reference thereto.

TECHNICAL FIELD

The present invention relates to a speech processing system, a vehicle, a speech processing unit, a steering wheel unit, a speech processing method, and a speech processing program.

BACKGROUND ART

In the above technical field, patent literature 1 discloses a technique of providing a sound insulating member between two microphones and acquiring speech in a sound space in which speech and noise coexist.

CITATION LIST

Patent Literature

Patent literature 1: WO 2012/096072

SUMMARY OF THE INVENTION

Technical Problem

In the technique described in the above literature, an L-shaped or conical sound insulating member is provided to make the sound difference between the two microphones large. However, there is a demand for more effectively acquiring the voice of a driver.

The present invention enables to provide a technique of solving the above-described problem.

Solution to Problem

One aspect of the present invention provides a speech processing system placed in a vehicle, comprising:

a first microphone that is provided on a surface facing a driver of the vehicle out of a steering wheel of the vehicle, and outputs a first signal corresponding to an input sound;

a second microphone that is provided at a position where a voice of the driver of the vehicle is blocked by at least part of the steering wheel in the vehicle, and outputs a second signal corresponding to an input sound; and a noise suppressor that suppresses an estimated noise signal based on the first signal and the second signal, and generates and outputs a pseudo speech signal.

Another aspect of the present invention provides a vehicle comprising a speech processing system including:

a first microphone that is provided on a surface facing a driver of the vehicle out of a steering wheel of the vehicle, and outputs a first signal corresponding to an input sound;

a second microphone that is provided at a position where a voice of the driver of the vehicle is blocked by at least part of the steering wheel in the vehicle, and outputs a second signal corresponding to an input sound; and a noise suppressor that suppresses an estimated noise signal based on the first signal and the second signal, and generates and outputs a pseudo speech signal.

Still other aspect of the present invention provides a speech processing unit attachable to a steering wheel of a vehicle, comprising:

a first microphone that faces a driver of the vehicle and outputs a first signal corresponding to an input sound when the speech processing unit is attached to the steering wheel of the vehicle;

a second microphone that does not face the driver of the vehicle and outputs a second signal corresponding to an input sound when the speech processing unit is attached to the steering wheel of the vehicle; and a noise suppressor that suppresses an estimated noise signal based on the first signal and the second signal, and generates and outputs a pseudo speech signal.

Yet another aspect of the present invention provides a steering wheel unit comprising the speech processing system.

Still yet another aspect of the present invention provides a speech processing method comprising:

acquiring a first signal corresponding to a sound input to a first microphone that is provided on a surface facing a driver of a vehicle out of a steering wheel of the vehicle, and inputs a voice of the driver;

acquiring a second signal corresponding to a sound input to a second microphone that is provided at a position where the voice of the driver of the vehicle is blocked by at least part of the steering wheel in the vehicle; and suppressing an estimated noise signal based on the first signal and the second signal, and generating and outputting a pseudo speech signal.

Yet still another aspect of the present invention provides a speech processing program for causing a computer to execute a method comprising:

acquiring a first signal corresponding to a sound input to a first microphone that is provided on a surface facing a driver of a vehicle out of a steering wheel of the vehicle, and inputs a voice of the driver;

acquiring a second signal corresponding to a sound input to a second microphone that is provided at a position where the voice of the driver of the vehicle is blocked by at least part of the steering wheel in the vehicle; and suppressing an estimated noise signal based on the first signal and the second signal, and generating and outputting a pseudo speech signal.

Advantageous Effects of Invention

According to the present invention, it is possible to more effectively acquire the voice of a driver.

BRIEF DESCRIPTION OF THE DRAWINGS

FIG. 6 is a view showing the arrangement of the speech processing system according to the fourth embodiment of the present invention;

FIG. 10 is a view showing an example of a microphone selection table used in the speech processing system according to the sixth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that "speech signal" in the following explanation indicates a direct electrical change that occurs in accordance with speech or another audio and transmits the speech or the other audio, and is not limited to speech.

First Embodiment

Figure 1:
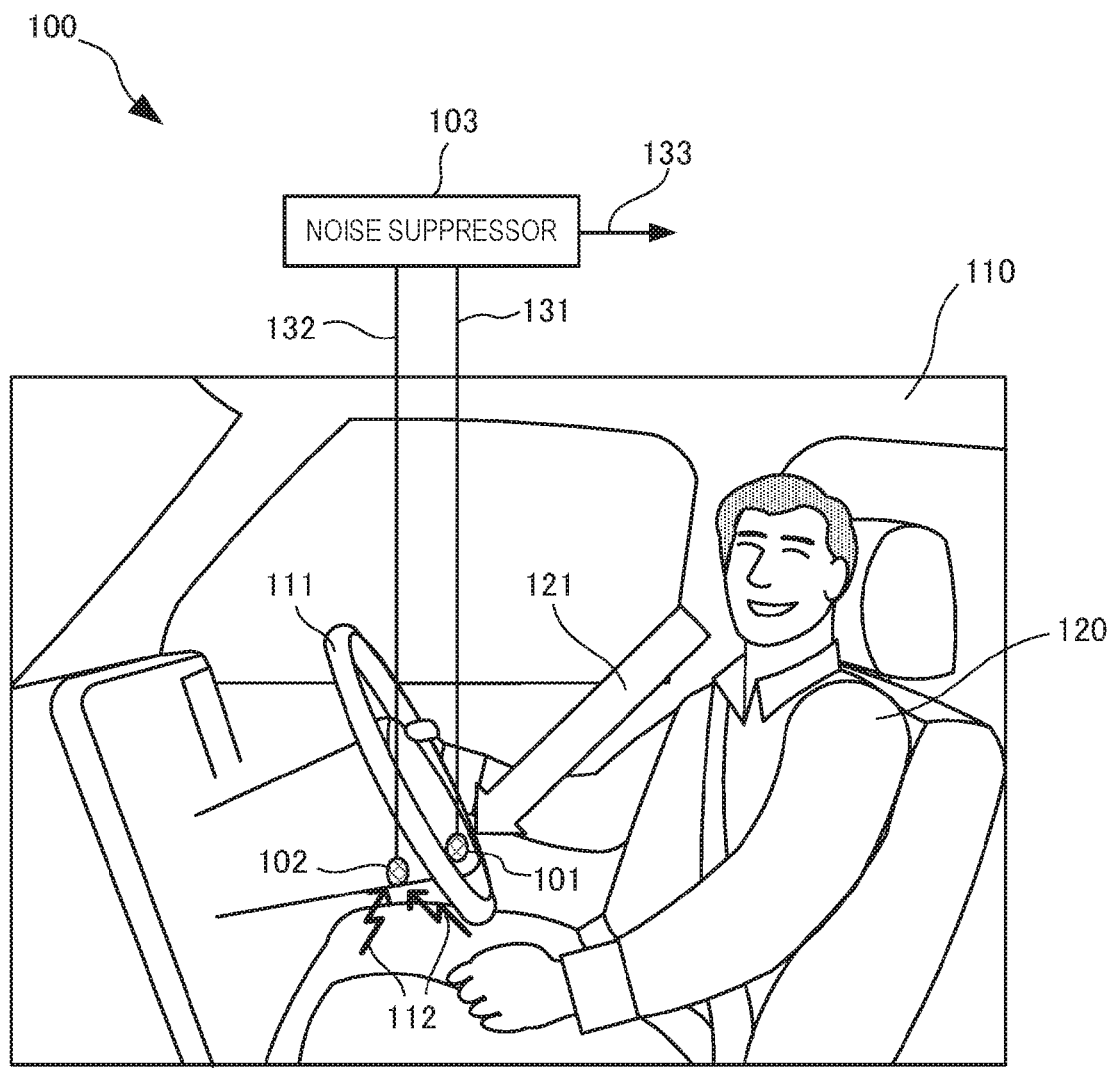
FIG. 1 is a view showing the arrangement of a speech processing system according to the first embodiment of the present invention.

A speech processing system 100 according to the first embodiment of the present invention will be described with reference to FIG. 1. As shown in FIG. 1, the speech processing system 100 is placed in a vehicle 110, and includes a first microphone 101, a second microphone 102, and a noise suppressor 103.

The first microphone 101 is provided on a surface facing a driver 120 of the vehicle 110 out of a steering wheel 111 of the vehicle 110, and outputs a first signal 131 corresponding to an input sound 121.

The second microphone 102 is provided at a position where the voice of the driver 120 of the vehicle 110 is blocked by at least part of the steering wheel 111 in the vehicle 110, and outputs a second signal corresponding to an input sound.

The noise suppressor 103 suppresses an estimated noise signal based on the first signal 131 corresponding to the sound input to the first microphone 101 and a second signal 132 corresponding to the sound input to the second microphone 102, and outputs a pseudo speech signal 133.

According to the above-described arrangement, it is possible to input a mixed speech of the voice 121 of the driver 120 and noise 112 in the vehicle 110 to the first microphone 101 and the second microphone 102, and the noise suppressor 103 can more effectively acquire the pseudo speech signal 133 as the voice of the driver at high quality.

Second Embodiment

A speech processing system 200 according to the second embodiment of the present invention will be described next with reference to FIGS. 2 to 3.

(Arrangement)

Figure 2:
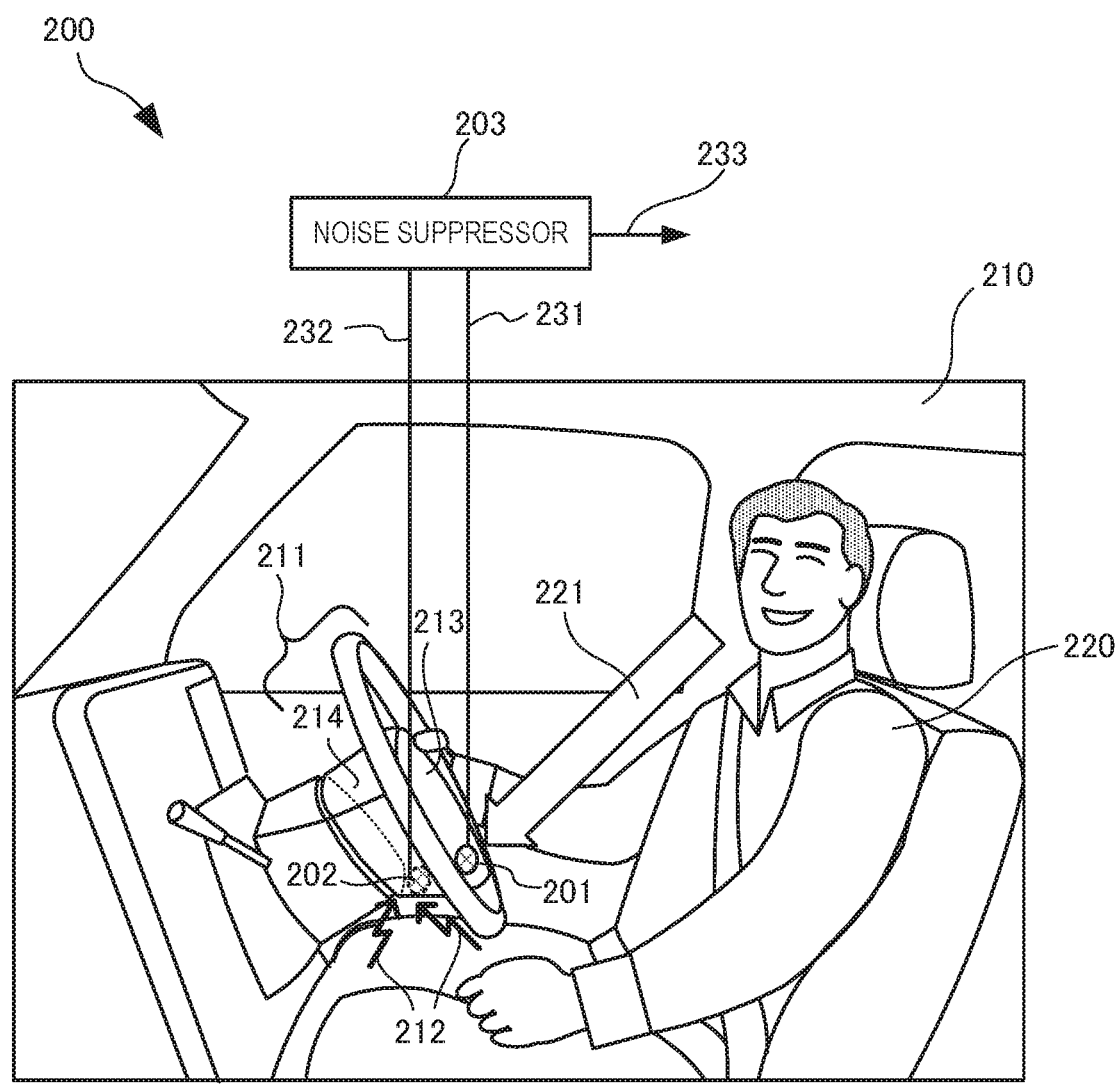
FIG. 2 is a view showing the arrangement of a speech processing system according to the second embodiment of the present invention.

FIG. 2 is a view showing the arrangement of the speech processing system 200 according to this embodiment. In this embodiment, the speech processing system 200 improves the quality of an enhanced speech signal corresponding to the voice of a driver using two microphones arranged in a vehicle and outputs the signal.

The speech processing system 200 includes microphones 201 and 202, and a noise suppressor 203. The noise suppressor 203 suppresses an estimated noise signal based on a first signal 231 corresponding to a sound 221 input to the microphone 201 and a second signal 232 corresponding to a sound 212 input to the microphone 202, and generates and outputs a pseudo speech signal (to be also referred to as an enhanced speech signal hereinafter) 233.

The microphone 201 is provided on a surface 213 facing a driver 220 of the vehicle 210 out of a steering wheel 211 of a vehicle 210, and inputs the voice 221 of the driver 220.

The microphone 202 is provided at a position where the voice of the driver 220 of the vehicle 210 is blocked by at least part of the steering wheel 211 in the vehicle 210, and inputs the noise 212 in the vehicle 210.

The microphone 201 is provided at the lower portion of the surface 213 facing the driver in a center portion 214 of the steering wheel 211. The microphone 202 is provided on the lower surface of the center portion 214 of the steering wheel 211. That is, on the steering wheel 211, the microphone 202 is placed ahead of the microphone 201 in the vehicle.

The sound mixture of the speech 221 and the noise 212 input to the microphone 201 and the sound mixture of the speech 221 and the noise 212 input to the microphone 202 have different mixture ratios. For this reason, the noise suppressor 203 that inputs the first signal 231 and the second signal 232 output from the microphones 201 and 202, respectively, efficiently suppresses the noise.

<<Noise Suppressor>>

Figure 3:
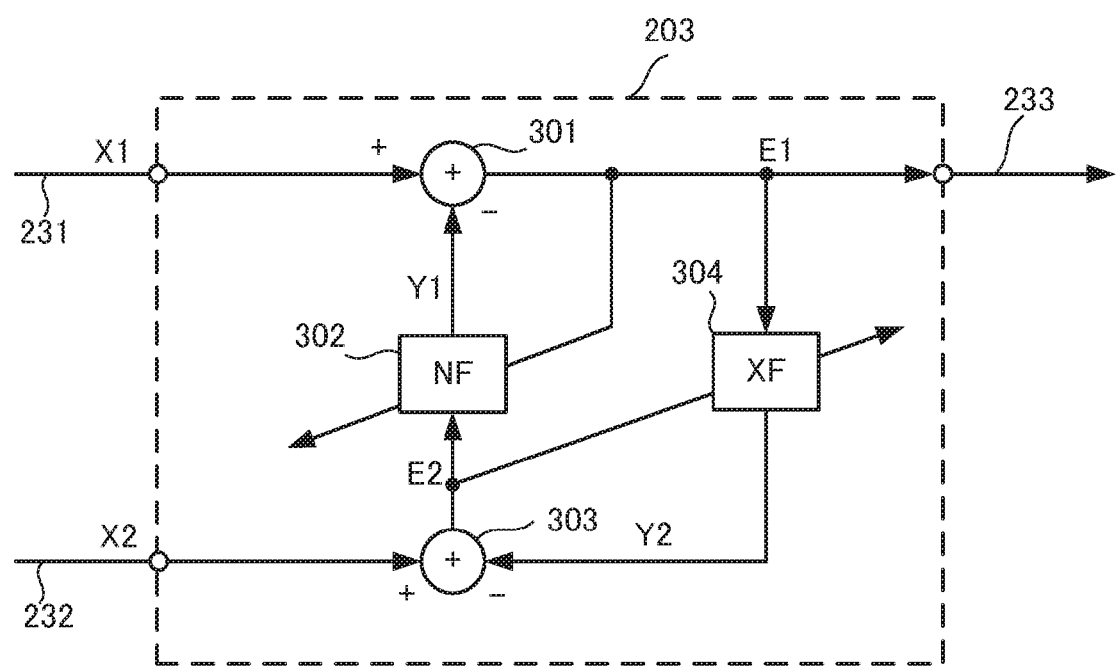
FIG. 3 is a view showing the arrangement of a noise suppressor according to the second embodiment of the present invention.

FIG. 3 is a view showing the arrangement of the noise suppressor 203 according to this embodiment. The noise suppressor 203 includes a subtracter 301 that subtracts, from a first signal X1 (231), an estimated noise signal Y1 estimated to be included in the first signal X1 (231). The noise suppressor 203 also includes a subtracter 303 that subtracts, from a second signal X2 (232), an estimated speech signal Y2 estimated to be included in the second signal X2 (232). The noise suppressor 203 also includes an adaptive filter NF (302) that generates the estimated noise signal Y1 from an enhanced noise signal E2 that is the output signal of the subtracter 303. The noise suppressor 203 also includes an adaptive filter XF (304) that generates the estimated speech signal Y2 from an enhanced speech signal E1 (233) that is the output signal of the subtracter 301. The adaptive filter XF (304) is described in International Publication No. 2005/024787. With this arrangement, the enhanced speech signal E1 is output.

The estimated noise signal Y1 is generated by processing the enhanced noise signal E2 by the adaptive filter NF 302 using a parameter that changes based on the enhanced speech signal E1 (233). The enhanced noise signal E2 is a signal generated by causing the subtracter 303 to subtract the estimated speech signal Y2 from the second signal 232. The estimated speech signal Y2 is generated by processing the enhanced speech signal E1 by the adaptive filter XF 304 using a parameter that changes based on the enhanced noise signal E2.

Note that the noise suppressor 203 can be any one of an analog circuit, a digital circuit, and a mixture thereof. When the noise suppressor 203 is an analog circuit, the enhanced speech signal E1 is converted into a digital signal by an A/D converter if it is used for digital control. On the other hand, when the noise suppressor 203 is a digital circuit, a signal from a microphone is converted into a digital signal by an A/D converter before input to the noise suppressor 203.

Alternatively, for example, the subtracter 301 or 303 may be formed from an analog circuit, and the adaptive filter NF 302 or the adaptive filter XF 304 may be formed from an analog circuit controlled by a digital circuit. The noise suppressor 203 shown in FIG. 3 is one of circuit examples suitable for this embodiment. An existing circuit that subtracts the estimated noise signal from the mixture signal and outputs the enhanced speech signal E1 (233) is usable.

The adaptive filter XF 304 shown in FIG. 3 can be replaced with a circuit that outputs a predetermined level to filter diffused speech. If the speech 221 included in the mixture signal X2 is much smaller than the noise 212 included in the mixture signal X2, the adaptive filter XF 304 can be omitted. In addition, the subtracter 301 and/or 303 can be replaced with an integrator by representing the estimated noise signal Y1 or the estimated speech signal Y2 as a coefficient to multiply the first mixture signal X1 or the second mixture signal X2. In addition, delay-and-sum array processing or delay-and-difference array processing may be performed for the first signal X1 or the second signal X2, and the processed signal may alternatively be used as an input to the noise suppressor 203.

According to this embodiment, neither a noise source nor a sound insulating member exists between the microphone 201 and the driver 220, and the microphone 201 can stably acquire the speech 221 of the driver 220 independently of the driving posture (lean forward or bend backward) of the driver 220. On the other hand, the microphone 202 is hardly affected by on/off of an air conditioner or audio system and stably inputs noise. In addition, whatever driving posture the driver 220 takes, the microphone 202 hardly acquires the speech 221 of the driver 220 as compared to the microphone 201 because part of the steering wheel 211 exists as a sound insulating member between the microphone 202 and the mouth position of the driver 220.

Hence, according to this embodiment, it is possible to input the voice of the driver 220 of the vehicle 210 and more efficiently output the high-quality enhanced speech signal 233. In addition, since the microphones 201 and 202 are not placed at the center position of the steering wheel 211, they do not impede airbag deployment at the time of an accident. Even after airbag deployment, the speech input function can be maintained.

Third Embodiment

Figure 4:
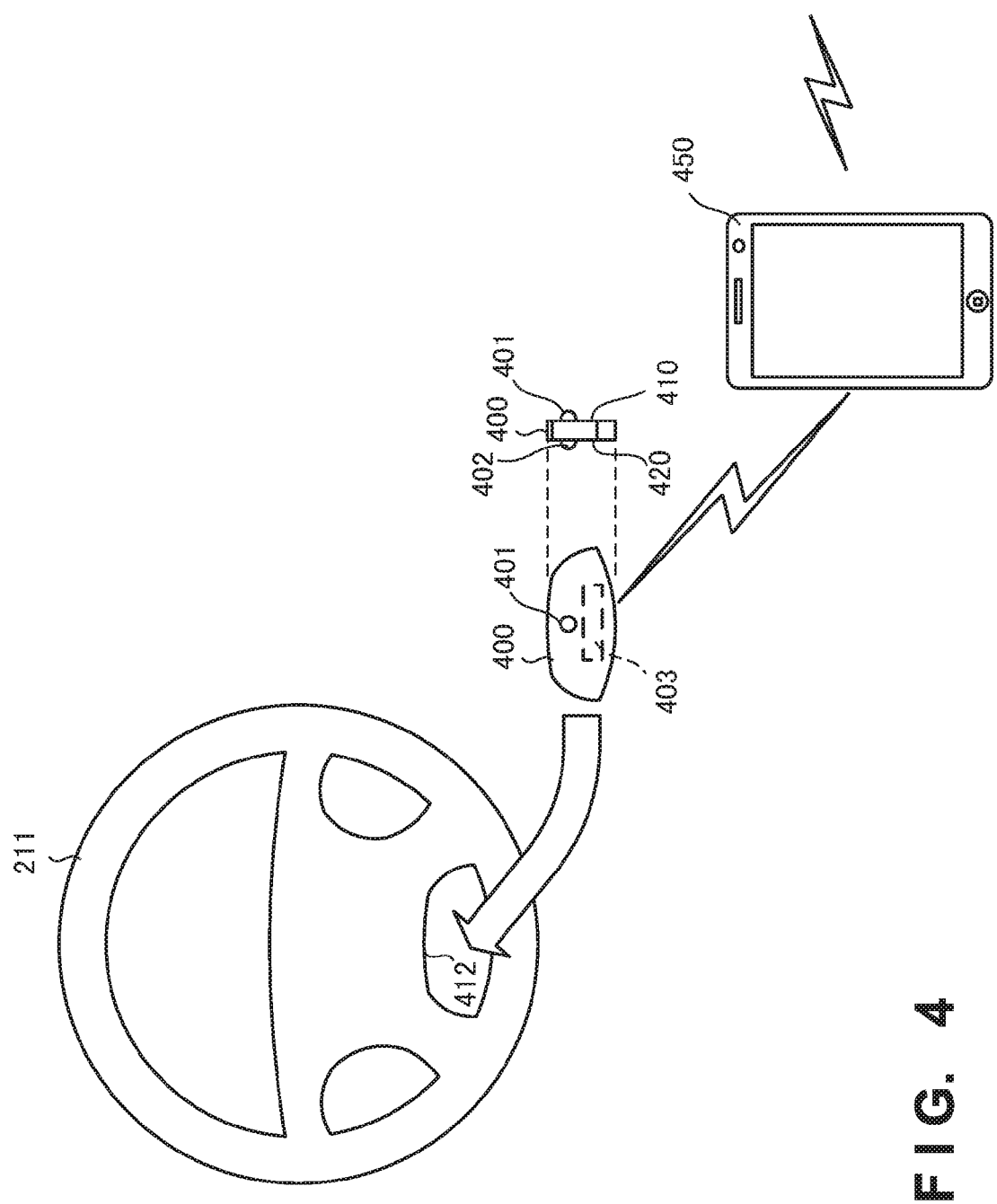
FIG. 4 is a view showing the arrangement of a speech processing unit according to the third embodiment of the present invention.

A speech processing unit 400 according to the third embodiment of the present invention will be described next with reference to FIG. 4. FIG. 4 is a view showing the arrangement of the speech processing unit 400 according to this embodiment. The speech processing unit 400 according to this embodiment is attachable to a steering wheel 211 of a vehicle already in use, and includes microphones 401 and 402, and a noise suppressor 403.

As an example, the speech processing unit 400 to be attached in a gap 412 provided under a surface facing a driver out of the steering wheel 211 will be described here. The outside shape of the speech processing unit 400 is formed in conformity with the shape of the gap 412. A surface 410 that faces the driver of the vehicle when the speech processing unit 400 is attached to the steering wheel 211 is provided with the microphone 401 that inputs the voice of the driver.

On the other hand, a surface 420 that does not face the driver of the vehicle when the speech processing unit 400 is attached to the steering wheel 211 is provided with the microphone 402 that inputs noise in the vehicle.

The speech processing unit 400 also incorporates the noise suppressor 403 that suppresses an estimated noise signal based on a first signal corresponding to the sound input to the microphone 401 and a second signal corresponding to the sound input to the microphone 402, generates a pseudo speech signal, and wirelessly outputs it to a smartphone 450 or the like using a short distance wireless communication technology such as Bluetooth®.

The remaining functions of the microphone 401, the microphone 402, and the noise suppressor 403 are the same as those of the microphone 201, the microphone 202, and the noise suppressor 203 according to the second embodiment, and a description thereof will be omitted here.

According to this embodiment, it is possible to obtain an excellent effect, that is, the effect of obtaining the effect of the second embodiment by very easily attaching the speech processing unit 400 to a conventional vehicle as well. In particular, hands-free speech communication via the smartphone 450 can easily and accurately be performed with robustness to noise. Note that although the smartphone 450 is used here, the present invention is not limited to this, and the pseudo speech signal may wirelessly be output to a car navigation system or car audio system (not shown) to enable a hands-free operation of the device. The speech signals input to the microphones 401 and 402 may directly be transmitted to the smartphone 450, and a noise suppression application in the smartphone 450 may perform noise suppression processing.

Fourth Embodiment

Figure 5:
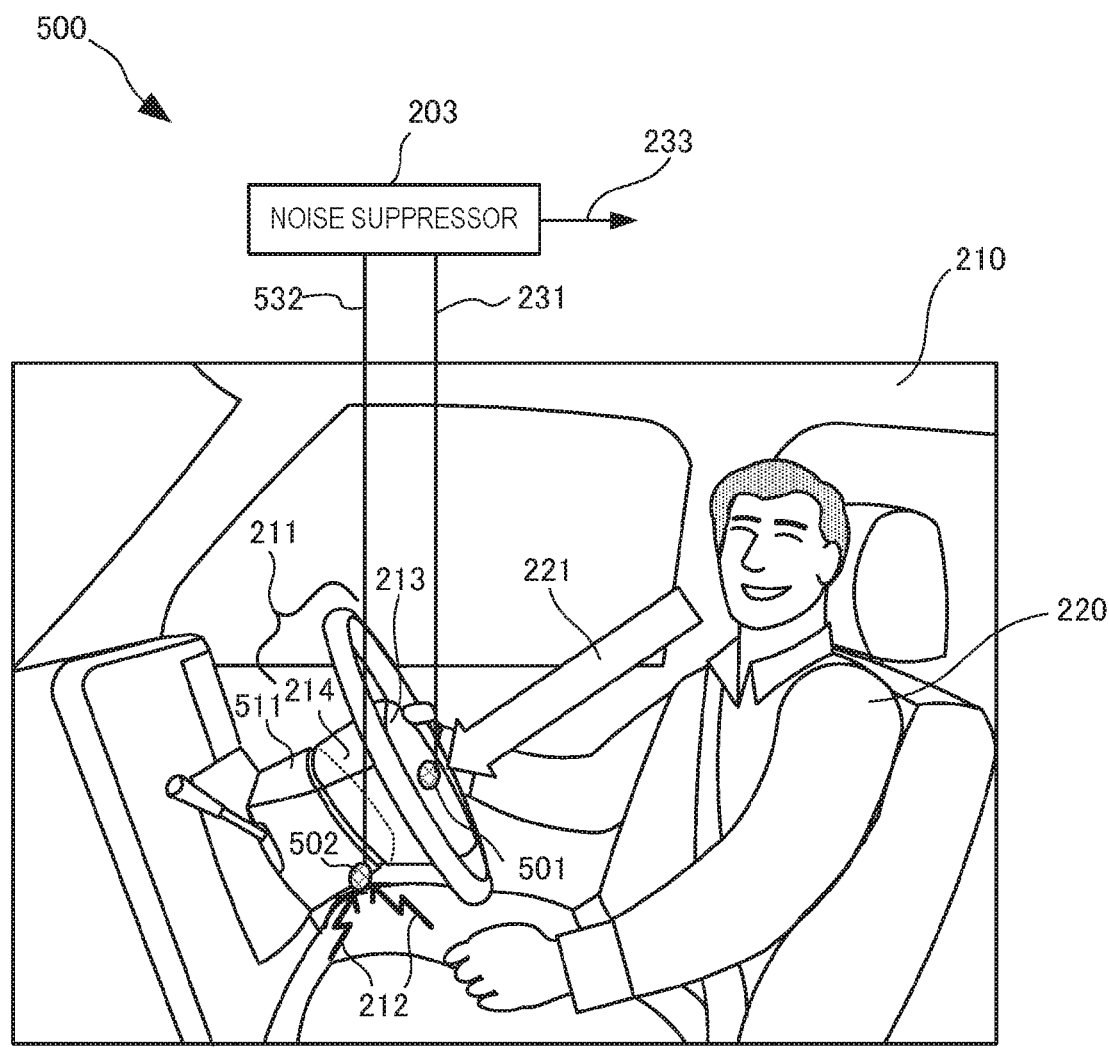
FIG. 5 is a view showing the arrangement of a speech processing system according to the fourth embodiment of the present invention.

A speech processing system 500 according to the fourth embodiment of the present invention will be described next with reference to FIGS. 5 and 6. FIG. 5 is a view showing the arrangement of the speech processing system 500 according to this embodiment. The speech processing system 500 according to this embodiment includes a microphone 501 attached to the rotation center of a steering wheel 211 of a vehicle 210, a microphone 502 attached not to the steering wheel 211 of the vehicle 210 but to a steering column cover 511, and a noise suppressor 203. The steering column cover 511 is the cover of the steering column that supports the steering wheel 211.

The arrangement is the same as that of the second embodiment except that the microphones 201 and 202 are replaced with the microphones 501 and 502. Hence, the same reference numerals denote the same parts, and a description thereof will be omitted.

In the second embodiment, when the steering wheel 211 is rotated, the level of a voice and the level or type of noise of the driver 220 input to the microphones 201 and 202 change. According to this embodiment, however, since the positions of the microphones 501 and 502 are constant independently of the steering angle, as shown in FIG. 6, the effect of performing stable noise suppression can be obtained.

Fifth Embodiment

Figure 7:
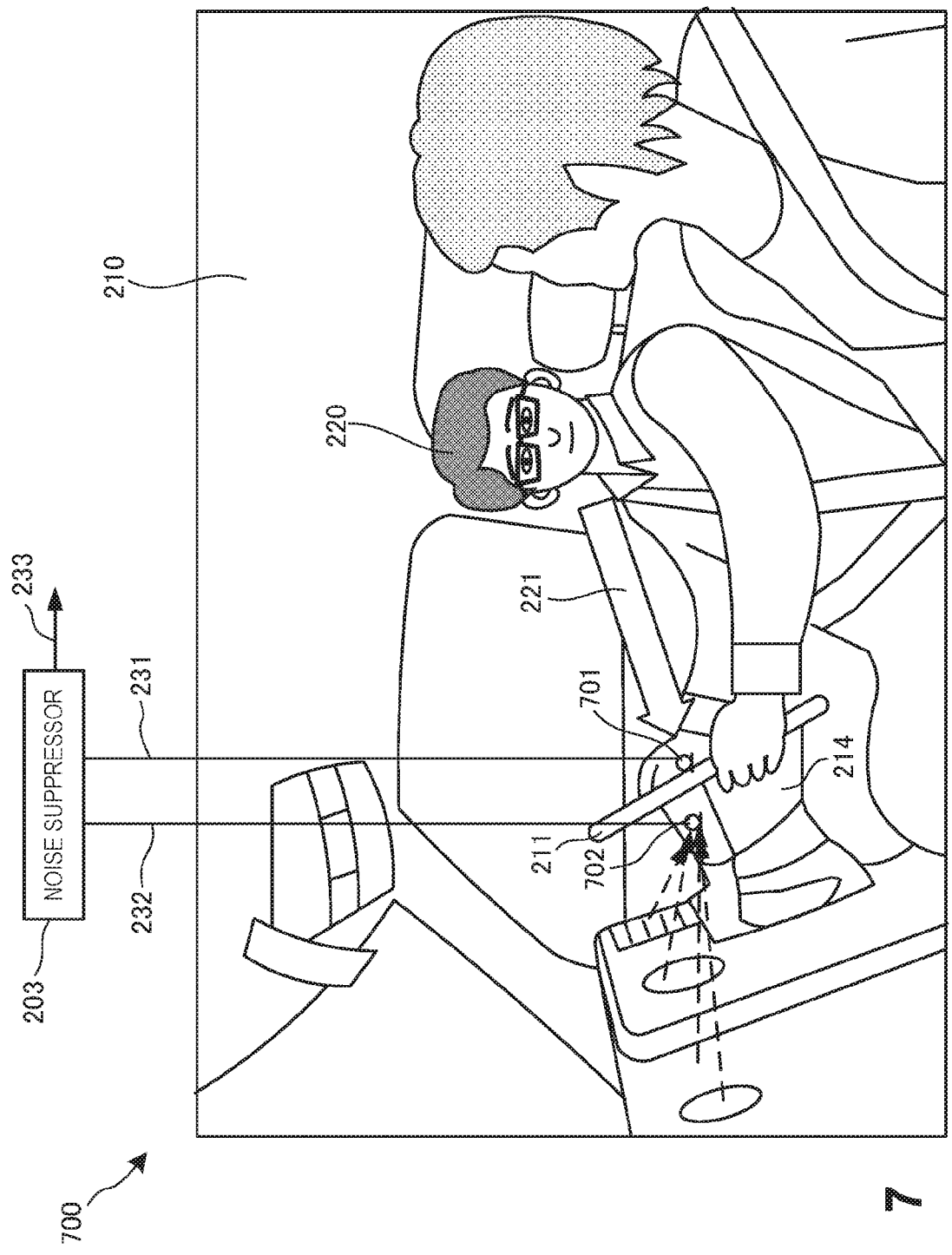
FIG. 7 is a view showing the arrangement of a speech processing system according to the fifth embodiment of the present invention.

A speech processing system 700 according to the fifth embodiment of the present invention will be described next with reference to FIG. 7. FIG. 7 is a view showing the arrangement of the speech processing system 700 according to this embodiment. The speech processing system 700 according to this embodiment includes a microphone 701 provided at the upper portion of a surface facing a driver in the center portion of a steering wheel 211 of a vehicle 210, a microphone 702 provided on the upper surface of the center portion of the steering wheel 211, and a noise suppressor 203.

The arrangement is the same as that of the second embodiment except that the microphones 201 and 202 are replaced with the microphones 701 and 702. Hence, the same reference numerals denote the same parts, and a description thereof will be omitted.

In this embodiment, since the microphone 701 is located closer to the position of the mouth of a driver 220, the effect of clearly inputting the speech of the driver 220 is obtained. On the other hand, since the microphone 702 is located at a position where it is readily affected by noise from an air conditioner or audio system, the noise suppressor 203 needs to take a contrivance to, for example, change the noise suppression method in accordance with on/off of the air conditioner or audio system in the vehicle 210.

Sixth Embodiment

Figure 8:
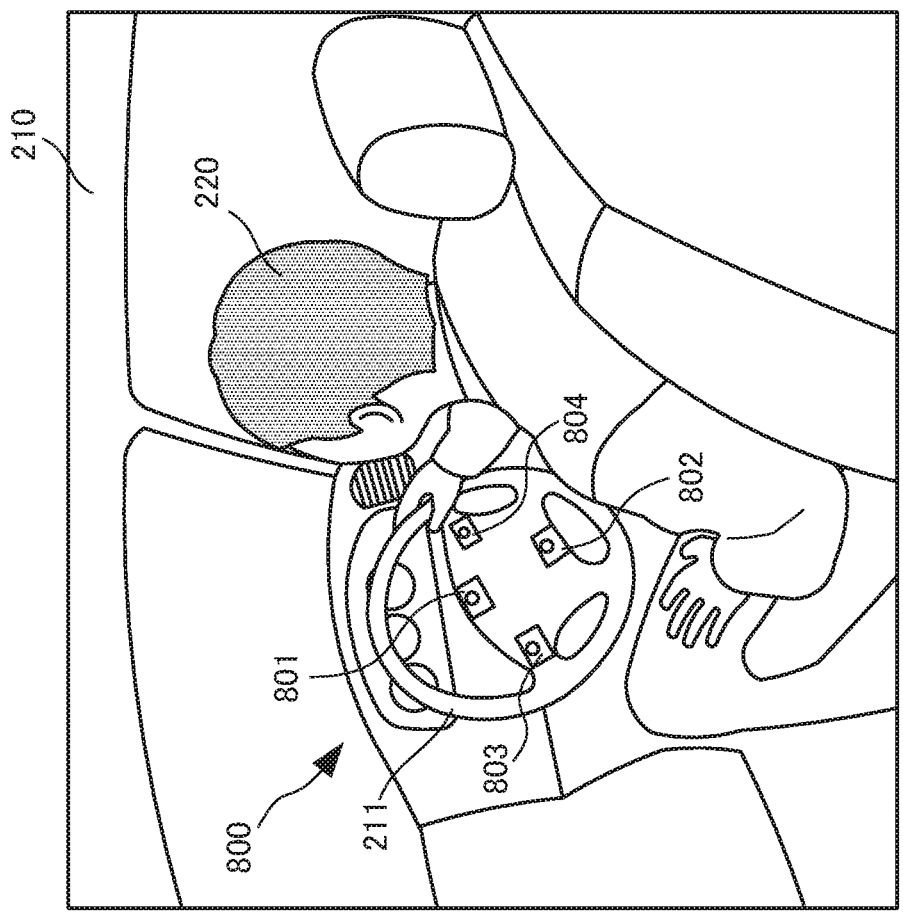
FIG. 8 is a view showing the arrangement of a speech processing system according to the sixth embodiment of the present invention.

A speech processing system 800 according to the sixth embodiment of the present invention will be described next with reference to FIGS. 8 to 11. FIG. 8 is a view for explaining the microphone arrangement of the speech processing system 800 according to this embodiment. A plurality of microphones 801 to 804 included in the speech processing system 800 are provided on a surface facing a driver 220 in the center portion of a steering wheel 211 and input the voice of the driver 220. In addition, microphones 805 to 808 that are not illustrated in FIG. 8 are provided at positions where the voice of the driver 220 of a vehicle 210 is blocked by at least part of the steering wheel 211, and input noise in the vehicle 210. That is, the microphones 805 to 808 are placed ahead of the microphones 801 to 804 in the vehicle.

The microphone 801 is provided at the upper portion of a surface facing the driver in the center portion of the steering wheel 211 of the vehicle 210. The microphone 802 is provided at the lower portion of the surface facing the driver in the center portion of the steering wheel 211 of the vehicle 210. The microphones 803 and 804 are provided on spokes extending leftward and rightward from the center portion of the steering wheel 211. The microphones 805 to 808 may be placed on the cover of the steering column.

Figure 9:
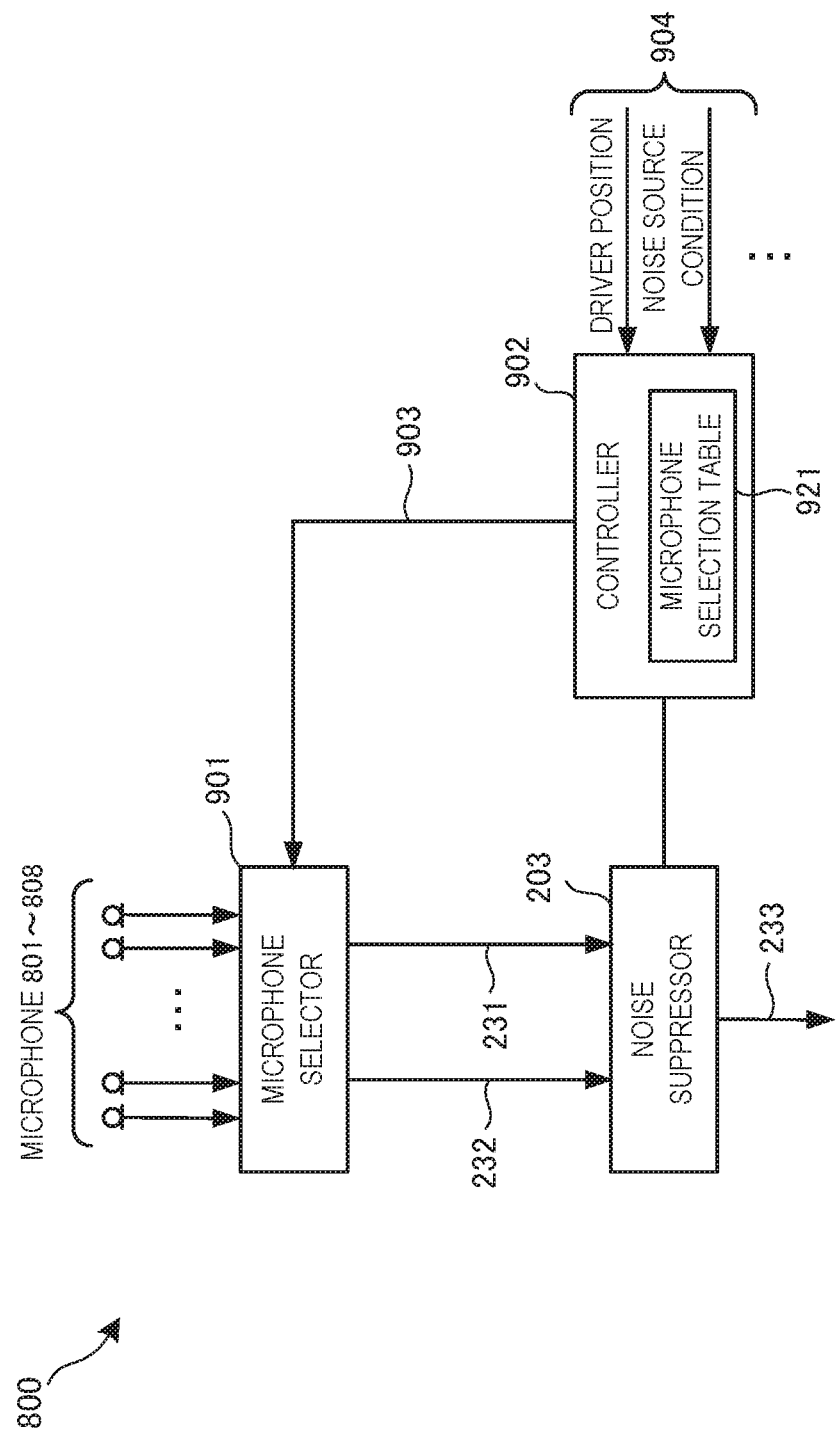
FIG. 9 is a view showing the arrangement of the speech processing system according to the sixth embodiment of the present invention.

FIG. 9 is a block diagram showing the arrangement of the speech processing system 800 according to this embodiment. The speech processing system 800 includes a microphone selector 901 and a controller 902 in addition of the microphones 801 to 808 and a noise suppressor 203.

The rest of the components and operations is the same as in the second embodiment. Hence, the same reference numerals denote the same components and operations, and a detailed description thereof will be omitted.

The microphone selector 901 determines the position of the mouth of the driver, and selects a microphone that outputs a signal 231 to the noise suppressor 203 from the microphones 801 to 804 in accordance with the driver position.

The microphone selector 901 also determines the noise source of noise in the vehicle, and selects a microphone that outputs a signal 232 to the noise suppressor 203 from the microphones 805 to 808 in accordance with the noise source.

The controller 902 includes a microphone selection table 921, and outputs a selection signal 903 to the microphone selector 901 based on environment information 904 such as the driver position and the noise source condition. The controller 902 controls the noise suppressor 203. For example, if speech or music is output from a speaker, or an air conditioner is driven, the controller 902 controls to, for example, change the noise suppression method.

The microphone may be selected in consideration of noise from another noise source such as noise coming from outside of the vehicle through an open window. In this case, an appropriate microphone is selected by detecting opening of the window. Alternatively, an appropriate microphone may be selected in accordance with on/off of blinkers, on/off of windshield wipers, and the traveling speed, which change the noise.

(Microphone Selection Table)

FIG. 10 is a view showing the arrangement of the microphone selection table 921 according to this embodiment. The microphone selection table 921 selects the combination of first and second microphones in accordance with the driver position and the noise source. The microphone selection table 921 is used by the controller 902 to select the combination of first and second microphones.

<<Processing Procedure of Speech Processing System>>

Figure 11:
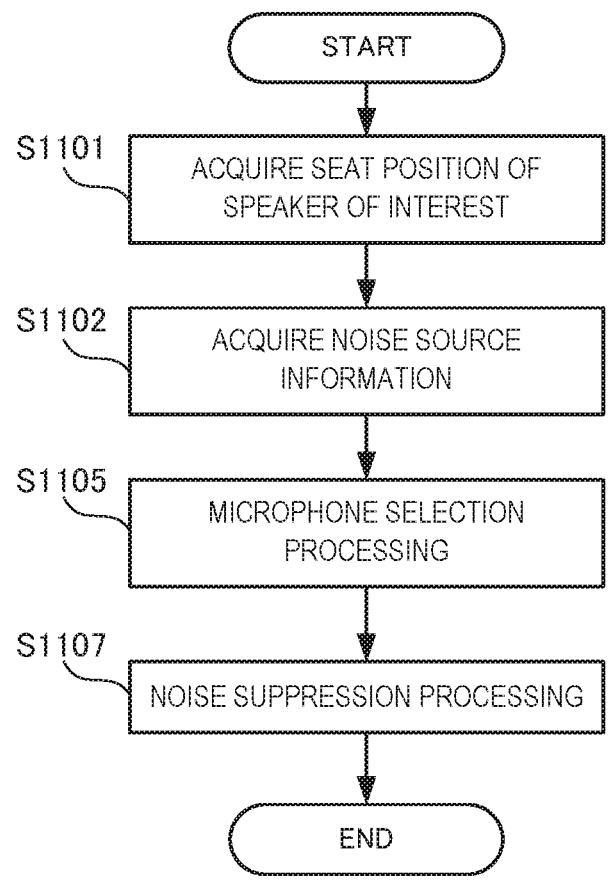
FIG. 11 is a flowchart showing the procedure of processing of the speech processing system according to the sixth embodiment of the present invention.

FIG. 11 is a flowchart showing the processing procedure of the speech processing system 800 according to this embodiment. This flowchart is executed by the CPU of the speech processing apparatus 800 using a RAM to implement the functional components shown in FIG. 9.

In step S1101, the speech processing system 800 acquires the seat position of the driver. In step S1102, the speech processing system 800 acquires the type and position of the noise source that generates noise to be suppressed. In step S1105, the microphone selector 901 selects the combination of a pair of microphones (or output signals) based on the seat position of the driver and the noise source. In step S1107, the noise suppressor 203 executes noise suppression processing.

According to this embodiment, since an appropriate microphone combination is used in accordance with the environment in the vehicle, noise suppression processing for the speech of the driver can be performed more appropriately.

Seventh Embodiment

Figure 12:
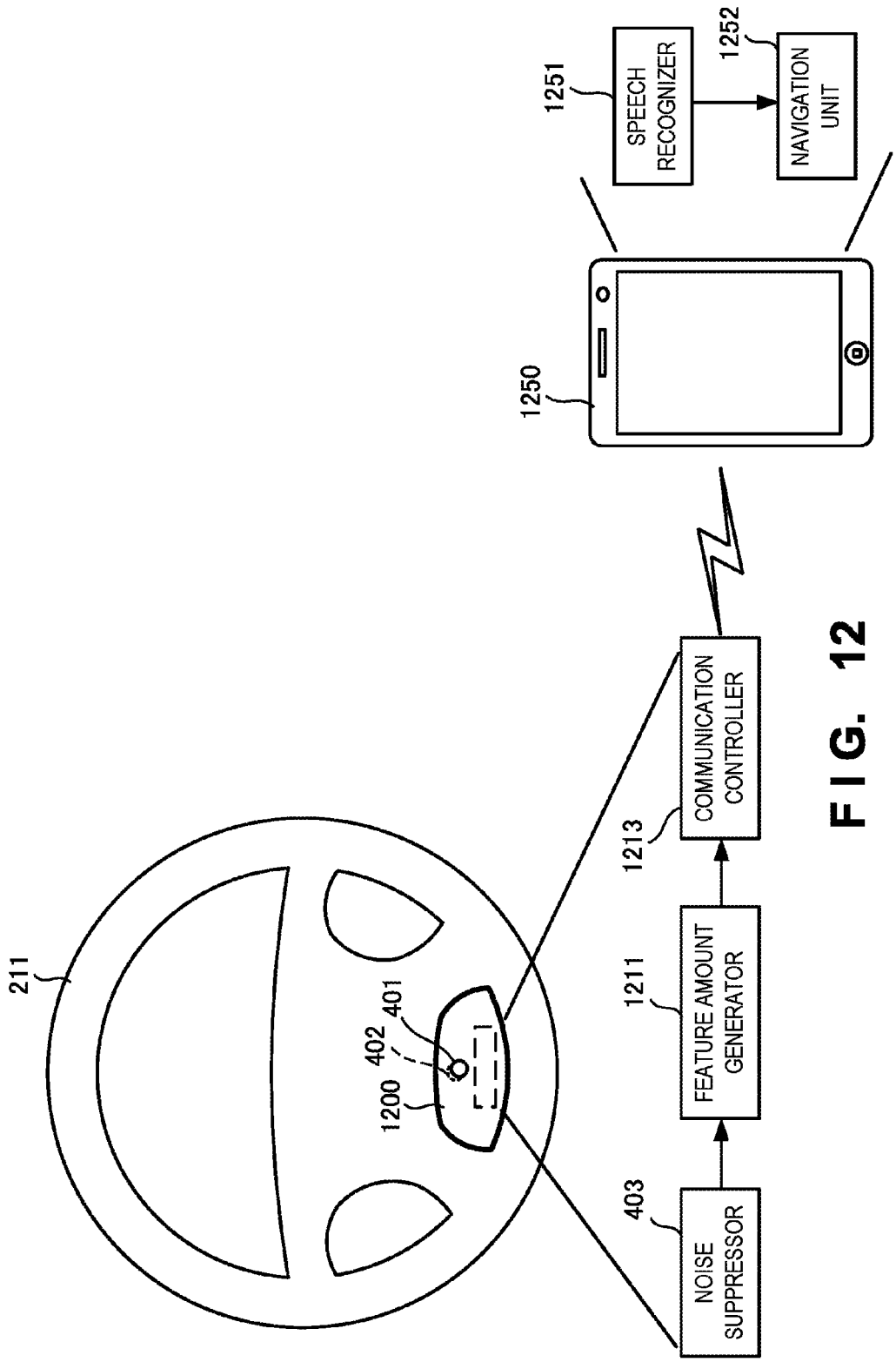
FIG. 12 is a view showing the arrangement of a speech processing system according to the seventh embodiment of the present invention.

A speech processing unit 1200 according to the seventh embodiment of the present invention will be described next with reference to FIG. 12. FIG. 12 is a view showing the arrangement of the speech processing unit 1200 according to this embodiment. The speech processing unit 1200 according to this embodiment is obtained by adding a feature amount generator 1211 and a communication controller 1213 to the speech processing unit 400 according to the third embodiment described with reference to FIG. 4. The rest of the components and functions is the same as in the third embodiment. Hence, the same reference numerals denote the same components, and a description thereof will be omitted.

The feature amount generator 1211 is provided inside the speech processing unit 1200, and generates a feature amount from a pseudo speech signal output from a noise suppressor 403. The communication controller 1213 wirelessly outputs the feature amount generated by the feature amount generator 1211 to a smartphone 1250 or the like using a short distance wireless communication technology such as Bluetooth®. The smartphone 1250 includes, for example, a speech recognizer 1251 that receives the feature amount sent from the communication controller 1213 and performs speech recognition, and a navigation unit 1252 that inputs the recognition result of the speech recognizer 1251 as a user operation.

According to this embodiment, it is possible to obtain an excellent effect, that is, the effect of obtaining the effect of the second embodiment by easily attaching the speech processing unit 1200 to a conventional vehicle as well. In particular, it is possible to easily send an operation instruction to the smartphone 1250 by hands-free communication with robustness to noise. Note that although the smartphone 1250 is used here, the present invention is not limited to this, and the pseudo speech signal may wirelessly be output to a car navigation system or car audio system (not shown) to enable a hands-free operation of the device.

Eighth Embodiment

Figure 13:
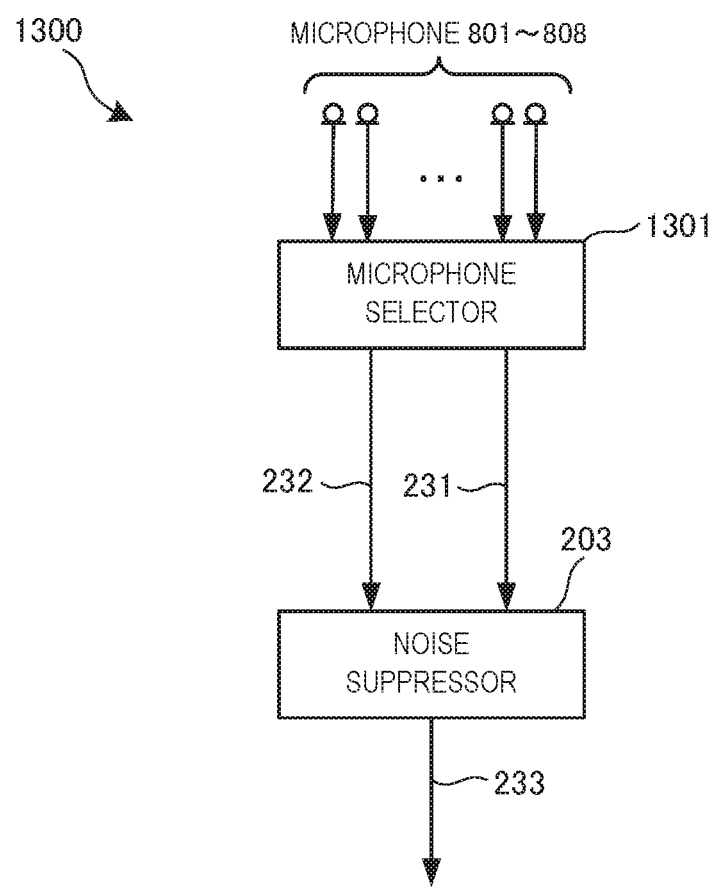
FIG. 13 is a view showing the arrangement of a speech processing system according to the eighth embodiment of the present invention.

A speech processing system 1300 according to the eighth embodiment of the present invention will be described next with reference to FIG. 13. FIG. 13 is a block diagram showing the arrangement of the speech processing system 1300 according to this embodiment. The speech processing system 1300 is equivalent to the speech processing system 800 according to the sixth embodiment without the controller 902. In the speech processing system 1300, a microphone selector 1301 selects a speech signal to be output to a noise suppressor 203 in accordance with the levels of speech outputs from microphones 801 to 808.

The rest of the components and operations is the same as in the sixth embodiment. Hence, the same reference numerals denote the same components and operations, and a detailed description thereof will be omitted.

According to this embodiment, a microphone can be selected with a more simple arrangement while using a plurality of microphones, and accurate speech can be acquired.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the present invention also incorporates a steering wheel unit including the speech processing system described in the embodiments.

The present invention is applicable to a system including a plurality of devices or a single apparatus. The present invention is also applicable even when a speech processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Application No. 2013-192096 filed on Sep. 17, 2013, which is hereby incorporated by reference herein in its entirety.

The invention claimed is:

1. A speech processing system placed in a vehicle, comprising:
    a first microphone that is provided on a surface facing a driver of the vehicle out of a steering wheel of the vehicle, and outputs a first signal corresponding to an input sound;
    a second microphone that is provided at a position where a voice of the driver of the vehicle is blocked by at least part of the steering wheel in the vehicle, and outputs a second signal corresponding to an input sound; and
    a noise suppressor that suppresses an estimated noise signal based on the first signal and the second signal, and generates and outputs a pseudo speech signal,
    wherein said first microphone is provided at a rotation center of the steering wheel, and said second microphone is provided not to the steering wheel but on a lower surface of a steering column cover which is a cover of a steering column that supports the steering wheel.

2. A speech processing method comprising:
    acquiring a first signal corresponding to a sound input to a first microphone that is provided on a surface facing a driver of the vehicle out of a steering wheel of a vehicle;
    acquiring a second signal corresponding to a sound input to a second microphone that is provided at a position where at least part of the steering wheel is placed between a mouth of a driver of the vehicle and said second microphone; and
    suppressing an estimated noise signal based on the first signal and the second signal, and generating and outputting a pseudo speech signal,
    wherein the first microphone is provided at a rotation center of the steering wheel, and the second microphone is provided not to the steering wheel but on a lower surface of a steering column cover which is a cover of a steering column that supports the steering wheel of a vehicle.

3. A non-transitory computer readable medium storing a speech processing program for causing a computer to execute a method comprising:
    acquiring a first signal corresponding to a sound input to a first microphone that is provided on a surface facing a driver of the vehicle out of a steering wheel of a vehicle;
    acquiring a second signal corresponding to a sound input to a second microphone that is provided at a position where at least part of the steering wheel is placed between a mouth of a driver of the vehicle and the second microphone; and suppressing an estimated noise signal based on the first signal and the second signal, and generating and outputting a pseudo speech signal, wherein the first microphone is provided at a rotation center of the steering wheel and the second microphone is provided not to the steering wheel but on a lower surface of a steering column cover which is a cover of a steering column that supports the steering wheel of a vehicle.

* * * * *